United States Patent
Ivanov et al.

(10) Patent No.: US 9,465,590 B2
(45) Date of Patent: Oct. 11, 2016

(54) CODE GENERATION FRAMEWORK FOR APPLICATION PROGRAM INTERFACE FOR MODEL

(71) Applicants: Petko Ivanov, Dresden (DE); Katja Pfeifer, Dresden (DE); Konrad Voigt, Dresden (DE); Andreas Doms, Dresden (DE)

(72) Inventors: Petko Ivanov, Dresden (DE); Katja Pfeifer, Dresden (DE); Konrad Voigt, Dresden (DE); Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 14/324,993

(22) Filed: Jul. 7, 2014

(65) Prior Publication Data

US 2016/0004516 A1    Jan. 7, 2016

(51) Int. Cl.
G06F 9/44 (2006.01)

(52) U.S. Cl.
CPC .. G06F 8/35 (2013.01); G06F 8/34 (2013.01)

(58) Field of Classification Search
CPC .............. G06F 8/10; G06F 8/20; G06F 8/30; G06F 8/35; G06F 8/70
See application file for complete search history.

(56) References Cited

U.S. PATENT DOCUMENTS

| | | | | |
|---|---|---|---|---|
| 7,627,852 B1* | 12/2009 | Stroomer | ................ | G06F 9/547 717/106 |
| 2005/0188353 A1* | 8/2005 | Hasson | ..................... | G06F 8/70 717/116 |
| 2007/0079299 A1* | 4/2007 | Daly | ........................ | G06F 8/30 717/141 |
| 2011/0307877 A1* | 12/2011 | Lambert | ............. | G06F 9/44505 717/166 |
| 2012/0297360 A1* | 11/2012 | Lucco | ....................... | G06F 8/30 717/108 |
| 2013/0139134 A1* | 5/2013 | Burka | ................... | G06F 9/4435 717/153 |
| 2014/0337760 A1* | 11/2014 | Heinrich | ........... | G06F 17/30893 715/753 |

OTHER PUBLICATIONS

CodePlex, DynamicJson,May 21, 2010, p. 1-4.*
Merks,Essential EMF, 2009,pp. 1-7.*

(Continued)

*Primary Examiner* — Duy Khuong Nguyen
(74) *Attorney, Agent, or Firm* — Fountainhead Law Group PC

(57) ABSTRACT

A code generating framework generates code for a model Application Program Interface (API). The framework comprises three components: an API code generator, a serialization code generator, and a deserialization code generator. The API code generator generates code for a model API. This model API produces a first model instance version in a first language. Code from the serialization code generator converts the model instance into a second version in a different language accessible to other applications (e.g., graphical modeling editors). Code from the deserialization code generator converts the second version of the model instance back into the original language. In a particular embodiment, the code generation framework generates JavaScript/XSJS APIs for manipulating model instances compatible with the Eclipse Modeling Framework (EMF). Serialization and deserialization code generated by the framework, converts the JavaScript/XSJS model instance into XMI recognized by other applications built on top of EMF, and back again into JavaScript/XSJS.

14 Claims, 10 Drawing Sheets

(56) References Cited

OTHER PUBLICATIONS

M. Brambilla, J. Cabot, and M. Wimmer, "Model-Driven Software Engineering in Practice". Morgan & Claypool Publishers, 1st edition, 2012, Chapter 1.2, pp. 2-3.
F. Budinsky, "Eclipse Modeling Framework: A Developer's Guide". The eclipse series. Addison-Wesley, 2004. Relevant pages: Chapter 2.4, pp. 23-28; Chapter 5.3, p. 108; Chapter 9.1.3, p. 182; Chapter 10, pp. 239-278; and Chapter 15.2, pp. 447-459.
Eclipse. ATI Zoo. Retrieved from: http://www.eclipse.org/atl/atlTransformations/, last visited Apr. 2014.
Eclipse. Eclipse Modeling Framework. Retrieved from: http://www.eclipse.org/modeling/emf/, last visited Apr. 2014.
Eclipse. Eclipse Modeling Project. Retrieved from: http://www.eclipse.org/modeling/, last visited Apr. 2014.
Eclipse. JS4EMF. Retrieved from: http://wiki.eclipse.org/JS4EMF, last visited Apr. 2014.
Eclipse. Xpand. Retrieved from: http://wiki.eclipse.org/Xpand, last visited Apr. 2014.
Ghillairet. Ecore.js. Retrieved from: http://ghillairet.github.io/ecore.js/, last visited Apr. 2014.
OMG. OMG MOF 2 XMI Mapping Specification, Version 2.4.1, Aug. 2011.
SAP. SAP Hana Database—Studio Installation and Update Guide. Retrieved from: http://help.sap.com/hana/SAP_HANA_Studio_Installation_Update_Guide_en.pdf, last visited May 28, 2014.
SAP. SAP Hana Developer Guide. Retrieved from: http://help.sap.com/hana/SAP_HANA_Developer_Guide_en.pdf, Document Version 11, Jul. 17, 2013.

\* cited by examiner

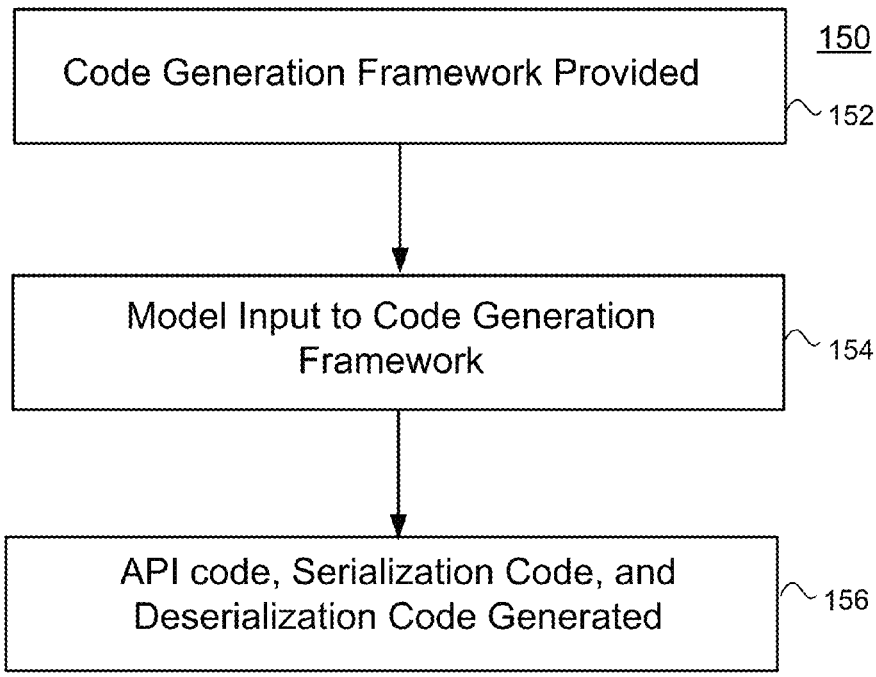
FIG. 1A
FIG. 1B
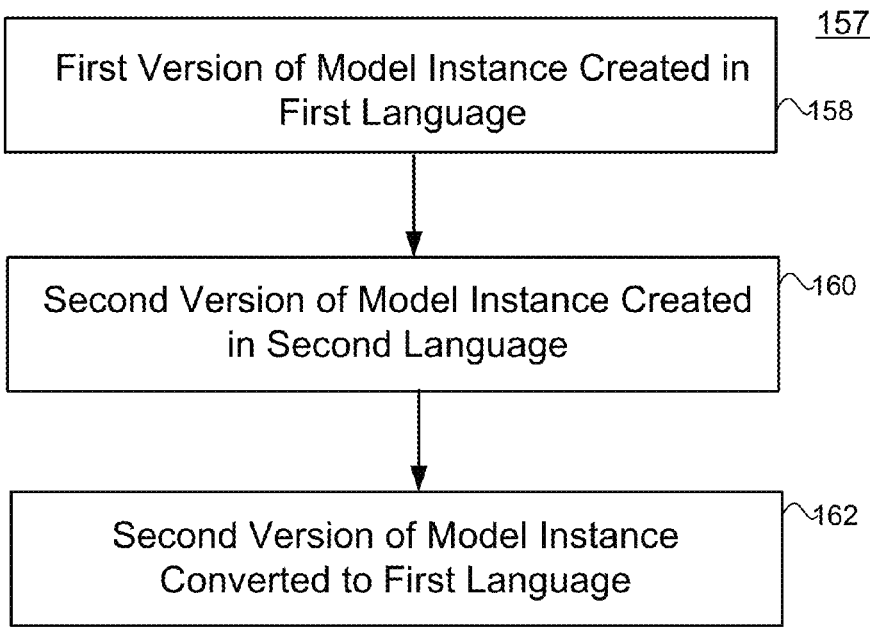

FIG. 5A

```
//create new factory object
var oCarFactory = new oCarApi.CarFactory();
```

FIG. 5B

```
oCarFactory.setEResource(
    new oCarApi.EResource("myIdentifier.example")
);
```

FIG. 5C

```
var oCar = oCarFactory.createCar();
```

FIG. 5D

```
oCar.setPrice(27000);
oCar.setNominal_weight(1250);
```

FIG. 5E

```
var oEngine = oCarFactory.createEngine();
oCar.setEngine(oEngine);
```

FIG. 5F
```
var oDealer = oCarFactory.createDealer();
oCar.getDealers().add(oDealer);
```

FIG. 5G
```
var EngineType = {
    diesel : "D",
    gasoline : "G",
    electric : "E"
};
```

FIG. 5H
```
oEngine.setEngineType(oCarApi.EngineType.diesel);
//alternatively oEngine.setEngineType("D");
```

FIG. 5I
```
var oValidationResult = oCar.validate();
if (oValidationResult.status === true) {
    //model instance (incl. all containment
    references) is valid
} else {
    return JSON.stringify(oValidationResult.errors);
}
```

FIG. 5J

```
var sCarXmi = oCarSerializer.serialize(oCar);
```

FIG. 5K

```
//load the xmi model (should be done by the
   developer) and get the string
var sXmi = loadModel();
//create a resource for the xmi representation
   and set the xmi string
var oCarResource = new oCarApi.EResource("
   myIdentifier.example");
oCarResource.setXmi(sXmi);
//create a resource set
var oResourceSet = new oCarApi.EResourceSet();
//add factory and deserializer mappings for the
   resource set
oResourceSet.addMapping("http://www.sap.com/
   CarExample.ecore", new oCarApi.CarFactory(),
   oCarDeserializer);
//add the resources to the resource set
oResourceSet.addEResource(oCarResource);
//call deserialize on the resource set
oResourceSet.deserialize();
//get the deserialized models from the resource
   set
var oCarModel = oCarResource.getContent();
```

CODE GENERATION FRAMEWORK FOR APPLICATION PROGRAM INTERFACE FOR MODEL

BACKGROUND

Embodiments relate to models utilizing data, and in particular, to methods and systems providing a code generation framework for an Application Program Interface (API) for models.

Unless otherwise indicated herein, the approaches described in this section are not prior art to the claims in this application and are not admitted to be prior art by inclusion in this section.

Models of increasing sophistication are being developed that rely upon volumes of stored data. Conventionally, access to create and modify such models occurs exclusively through a custom Application Program Interface (API) dedicated for this purpose.

Reliance upon such a single, custom API for modeling, however, can be limiting to a user. For example, the EMF (Eclipse Modelling Framework) is widely used. Ecore models are the metamodel for describing models in EMF.

Models created with EMF describe the properties of a domain of interest (e.g., the database domain, the car domain, etc.) the model of the stored data, for example as may be present in a database. One example of a database is the HANA in memory database available from SAP AG of Walldorf, Germany. The HANA Studio software is designed to allow HANA to interact with a modeling program such as EMF.

In the HANA Studio, there are multiple graphical editors built on top of the Ecore models. Examples of such graphical editors include but are not limited to attribute view, calculation view, Enterprise Performance Management (EPM) editor, etc. To create such model instances (EPM, attribute views, calculation views), the user has to use the graphical editors.

Alternatively, a user can write an xml representation of the serialized version of such a model. This, however, is labor-intensive and a convenient way to programmatically create such model instances is lacking.

Here, it is noted that an API (provided by the EMF framework) already exists, but it is in JAVA. However, the developers of HANA XS applications need an API in another language.

To try and create the API manually is a complicated and time consuming task. For example, developers of HANA XS applications use the XSJS language, from which APIs for creating Ecore instances, can be implemented. Again however this is a complicated and time consuming task, as such APIs can comprise 20,000-30,000 lines of code for more complex Ecore models.

Furthermore, it is noted that the Ecore models may change frequently. Thus any API's implemented from scratch would also need to be changed, to ensure coherence with the corresponding Ecore metamodels. This causes additional overhead and makes the code difficult to maintain.

Accordingly, there is a need for apparatuses and methods for implementing APIs for modeling purposes.

SUMMARY

A code generating framework generates code for a model Application Program Interface (API). The framework comprises three components: an API code generator, a serialization code generator, and a deserialization code generator.

The API code generator generates code for a model API. This model API is used to produce a first model instance version in a first language. Code from the serialization code generator converts the model instance into a second version in a different language. This second version may be accessible to other applications such as graphical modeling editors. Code from the deserialization code generator may be used to convert the second (e.g., edited) version of the model instance back into the original language for further interaction with the model API. Also, code from the deserialization code generator may be used to convert a model instance initially created from another application in the different language (e.g., graphical modeling editor for the model), into the first language.

In a specific embodiment, the code generation framework receives as input, an Ecore model. The framework in turn generates code for an API used in creating a first model instance version in the JavaScript language. Serialization code generated by the framework is used to convert this first model instance version into a second version in the XMI language compatible with other applications that build upon EMF (e.g., graphical model editors). Deserialization code generated by the framework is used to convert the second (XMI) model instance version, back into JavaScript for interaction with the API. The generic nature of the code generation framework may allow its application in diverse application areas (e.g., graphical web editors for model instances of Ecore models) where integration with other tooling built around EMF is called for, and the development language is JavaScript.

An embodiment of a computer-implemented method comprises providing a code generation framework comprising an Application Program Interface (API) code generator element, a serializer code generator element, and a deserializer code generator element. In response to the code generation framework receiving a model as an input, the API code generator element is caused to parse the model and generate an API used to create a first model instance version in a first language. The serializer code generator element is caused to parse the model and generate serialization code used to create a second model instance version in a second language from the first model instance version. The deserializer code generator element is caused to parse the model and generate deserialization code used to convert a model instance version in the second language, into the first language.

A non-transitory computer readable storage medium embodies a computer program for performing a method comprising providing a code generation framework comprising an Application Program Interface (API) code generator element, a serializer code generator element, and a deserializer code generator element. In response to the code generation framework receiving a model as an input, the API code generator element is caused to parse the model and generate an API used to create a first model instance version in a first language. The serializer code generator element is caused to parse the model and generate serialization code used to create a second model instance version in a second language comprising XMI, from the first model instance version. The deserializer code generator element is caused to parse the model and generate deserialization code used to convert a model instance version in the second language into the first language.

A computer system comprises one or more processors and a software program, executable on said computer system and configured to provide a code generation framework comprising an Application Program Interface (API) code generator element, a serializer code generator element, and a deserializer code generator element. In response to the code generation framework receiving a model as an input, the software program is configured to cause the API code generator element to parse the model and generate an API used to create a first model instance version in a first language comprising JavaScript or XSJS. The software program is configured to cause the serializer code generator element to parse the model and generate serialization code used to create a second model instance version in a second language comprising XMI from the first model instance version. The software program is configured to cause the deserializer code generator element to parse the model and generate deserialization code used to convert a model instance version in the second language into the first language.

In an embodiment the model instance version in the second language comprises the second model instance version.

In certain embodiments wherein the model instance version in the second language comprises is created by a follow-on application.

According to some embodiments the model instance version in the second language is created by the follow-on application comprising a graphical model editor.

In particular embodiments the first language comprises JavaScript or XSJS.

In various embodiments the second language comprises XMI.

In certain embodiments the model is created from a JAVA interface, XML schema, or UML.

In some embodiments the model is defined in Ecore format.

Particular embodiments further comprise editing the converted model instance version in the first language.

The following detailed description and accompanying drawings provide a better understanding of the nature and advantages of embodiments.

BRIEF DESCRIPTION OF THE DRAWINGS

FIG. 1A is a simplified process flow illustrating steps of code generation according to an embodiment.

FIG. 1B is a simplified process flow according to an embodiment illustrating utilization of generated code.

FIGS. 5A-5K show code that may be used to implement various aspects of the example.

DETAILED DESCRIPTION

Described herein are techniques for implementing a code generating framework for a model API according to an embodiment. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications of the features and concepts described herein.

Figure 1:
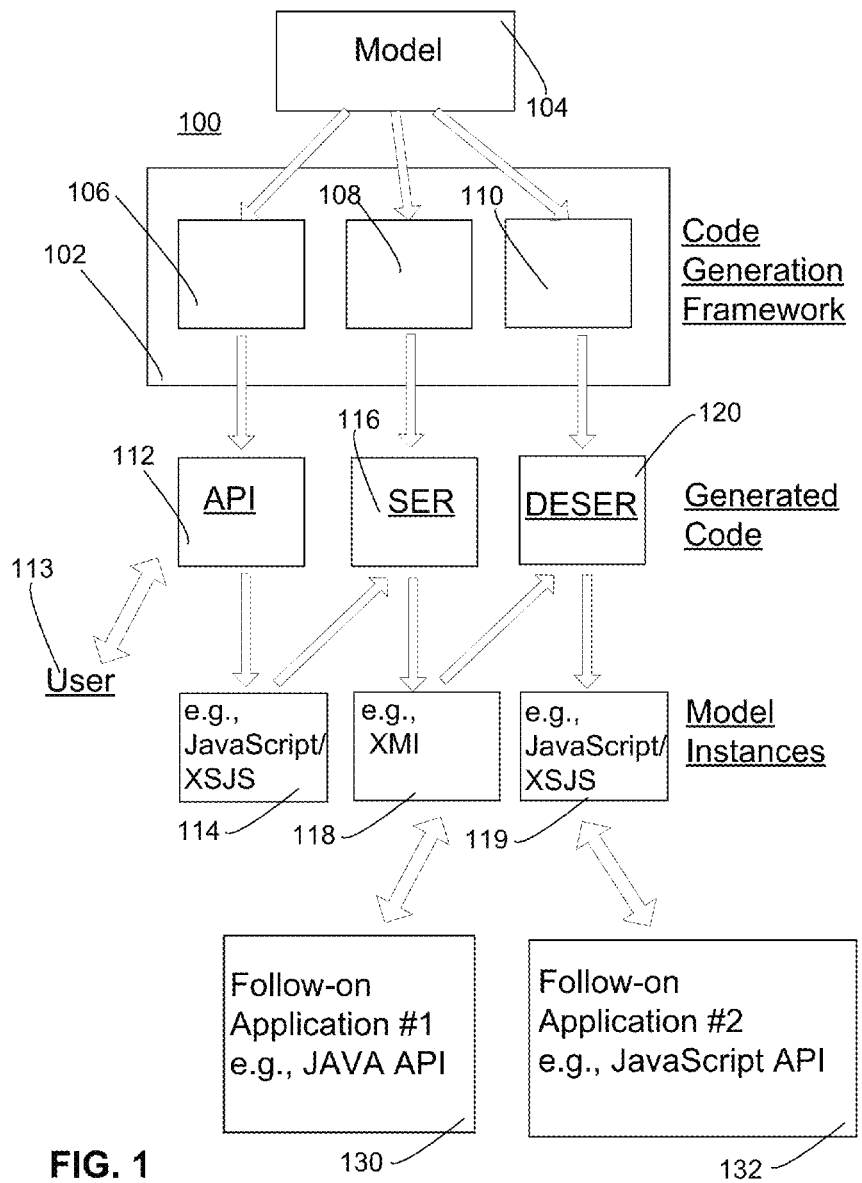
FIG. 1 illustrates a system configured to implement a model API according to one embodiment.

FIG. 1 shows a simplified view of a system 100 configured to implement a model API according to an embodiment. In particular, code generator 102 is configured to receive as an input, a model 104.

This model 104 is used to describe a particular domain. Many types of domains can be described using a model. Examples include but are not limited to an Enterprise Performance Management (EPM) domain, a database domain, and a person. In the simplified example provided for illustration later below, the modeled domain comprises a car.

The model 104 is expressed in a particular modeling language. For example, as described in detail below, an Ecore model may be described in XMI. Such an XMI representation can be created from Java Interfaces, XML Schema, or Unified Modeling Language (UML).

The code generator 102 comprises three components: an API code generator 106, a serializer code generator 108, and a deserializer code generator 110. Each of these three components is configured to generate executable code in response to the model.

Specifically, the API code generator 106 is configured to parse the model and generate therefrom, code 112 comprising an Application Program Interface. This API code comprises a tool that allows a user 113 to utilize the model in specific ways.

Thus the API code allows the user 113 to create an actual instance 114 of the model in a particular language. Therefore, in an example where the model describes a car, the API allows a developer to create one concrete instance of a car (e.g., a specific car owned by a particular dealer and having a specific gas or diesel engine). In particular embodiments, the user may employ the generated API code to create the model instance 114 in the JavaScript/XSJS language.

As shown in FIG. 1, a second component of the code generator is the serializer code generator 108. The serializer code generator 108 is configured to parse the input model, and to generate serialization code 116 therefrom. This serialization code in turn is configured to produce a different version 118 of the model instance 114.

In particular, FIG. 1 shows that the serialization code 116 receives the model instance 114 as input, and generates therefrom a second version 118 of the model instance. This second version of the model instance is expressed in a language different from the original version initially produced by the API.

In a particular embodiment, the second version 118 of the model instance represents a transformation from a JavaScript/XSJS expression of the original model instance, into an XMI representation. Here, this XMI representation of the model instance is an interchange format. It can be recognized as the common part (e.g., between JavaScript model instances and JAVA model instances).

FIG. 1 thus shows the second model instance 118 as capable of recognition and manipulation by a first follow-on application 130 (e.g., Ecore graphical web editor) utilizing an API written in a specific language (e.g., JAVA).

Operation of the deserializer code generator 110 is now described. The deserializer code generator 110 may be used for at least the following.

In a first case, a serialized instance is to be edited. Then, this serialized instance is converted to the original language of its creation, and modifications on model instances can be performed using the API 112.

In a second case, the need may arise to edit a model instance created by another application 130, in another language (e.g. JAVA) and serialized to XMI. Then, the deserialization code generator is used. In this manner, developers of applications in the JavaScript(XSJS) language can edit models, which were created by applications written in another language (e.g., JAVA).

The deserializer code generator 110 is configured to parse the input model, and to generate deserialization code 120 therefrom. The deserialization code is configured to take as input the persisted second version of the model instance (e.g., in XMI), and to convert that version of the model instance back into its original (e.g., JavaScript) language as the model instance version 119.

The version 119 of the model instance is capable of recognition and manipulation by a second follow-on application 132 (e.g., graphical web editor) utilizing an API written in a different language (e.g., JavaScript).

FIG. 1A is a simplified flow diagram showing steps of a process 150 of generating code for API, serialization, and deserialization according to an embodiment. A first step 152 comprises providing a code generation framework comprising an API code generator, a serializer code generator, and a deserializer code generator.

A second step 154 comprises providing a model as input to the code generation framework. In response to this input, according to a third step 156, the API code generator produces code corresponding to an API, the serializer code generator produces serialization code, and the deserializer code generator produces deserialization code.

The simplified flow diagram of FIG. 1A shows generation of the API code, serialization code, and deserialization code. The simplified flow diagram of FIG. 1B in turn shows how to use the results (its output) of the generation framework.

Specifically, with the API a first version of the model instance can be created. This instance is automatically converted by the serializer into a second version in second language. The second version can in turn, if needed, be converted (deserialized) into the first version.

Thus in step 158 of the simplified process flow 157 of FIG. 1B, the API is used to generate a first version of a model instance in a first language. In step 160, the serialization code is used to convert the first version of the model instance into a second language. In step 162, the deserialization code is used to convert the second version of the model instance back into the first language.

Example

A specific embodiment is now described in connection with creation of a code generation framework which takes as input EMF Ecore models, and generates APIs in JavaScript/XSJS with which model instances can be created, edited, serialized, and deserialized.

The HANA Studio available from SAP AG of Walldorf, Germany, uses the tooling provided by EMF amongst others in the Eclipse based development environment for creating software build upon and around the SAP HANA database. HANA Studio offers a set of editors and applications, to allow developers to manage the database, create new or modify existing models of data, manage authorizations, etc.

Some editors in HANA Studio are graphical editors based on Ecore models describing data models. The editors are used by developers to create model instances. In addition, model instances can be created programmatically by using API code (e.g., in JAVA) generated with the help of the tooling provided by EMF. However, the graphical editors are used, as the API code in JAVA is not exposed to the users.

SAP HANA Extended Application Services (XS services) available from SAP AG of Walldorf, Germany may desirably reuse components from the Eclipse-based world. Such XS services are written in the XSJS programming language which is a server-side JavaScript.

Figure 2:
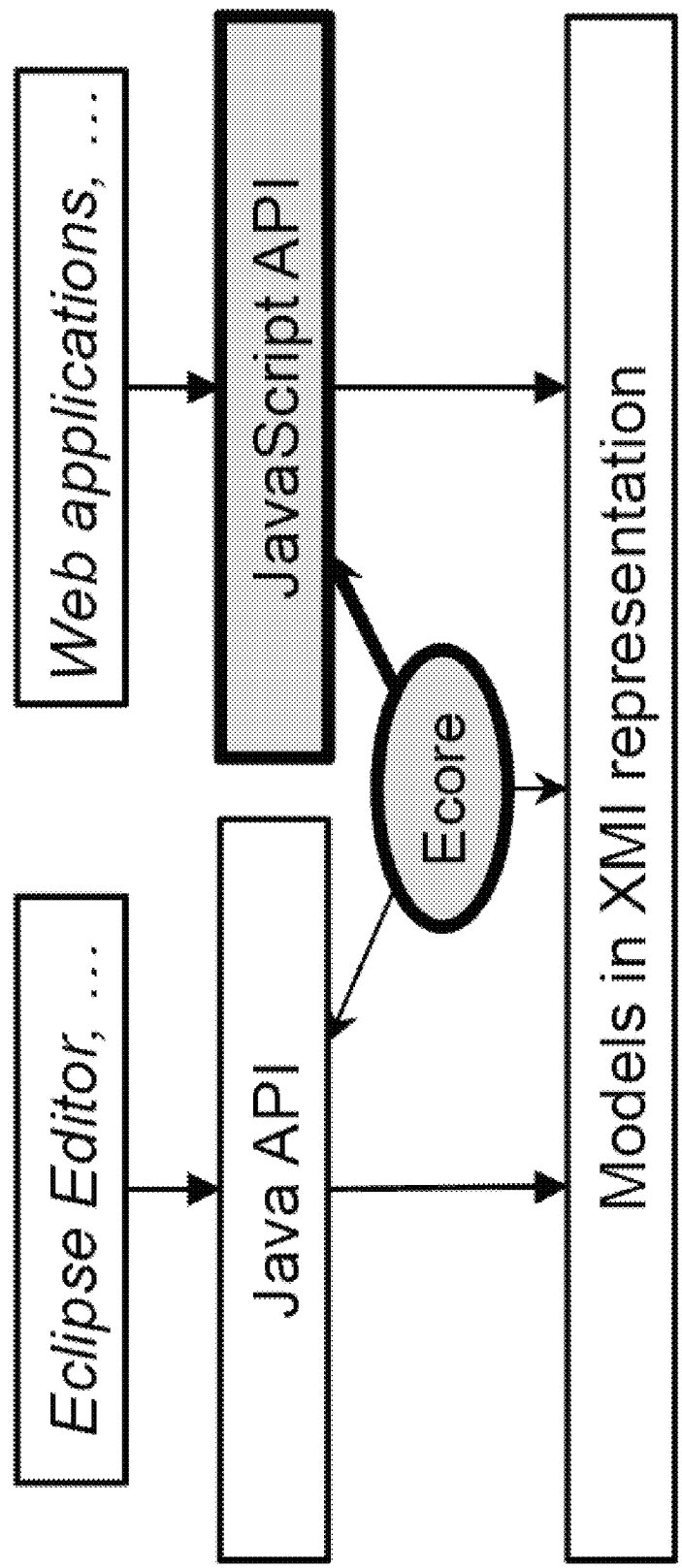
FIG. 2 is a simplified block diagram illustrating a system using EMF models in Java and JavaScript according to one example.

This example describes EMF-like tooling for JavaScript, which allows reuse of existing components and building of corresponding APIs in JavaScript that can be used to create JavaScript model instances. As shown in FIG. 2, this tooling persists those JavaScript API instances as XMI and use the XMI to exchange instances between the two worlds: the Java side with its Eclipse editors, and the JavaScript side with its XS application.

Within the developed XS applications, instances of a number of Ecore models are to be created. Here, the Ecore models cover two modeling domains: Enterprise Performance Management (EPM), and analytical data modeling.

The EPM group of Ecore models includes two central Ecore models and three helper Ecore models. One of the central Ecore models comprises eighty-nine classes and seven enumeration types. The other central Ecore model has eight classes and one enumeration type. In average the classes have two references and one attribute.

The helper models are mainly defining additional common helper types and abstractions. They have between 15 and 25 classes (containing mainly attributes and less references) and between 20 and 50 enumeration types.

The domain of business data modeling comprises 15 Ecore models with diverse sizes, containing between 15 and 80 classes. These models were used for modeling analytical data, e.g., modeling of data cube, dimensions, measures, and views.

For both modeling domains the Ecore models hold containment references to other Ecore models (intra-references). The Ecore models also hold non-containment references pointing to other parts of model instances (inter-references).

In addition to the classes and data types, the Ecore models also contain special annotations. For example, these special annotations may say that the elements should be serialized with another name) and EMF-features (e.g., ID-attributes, derived attributes, etc.) to be considered.

As mentioned previously, metamodels may be updated frequently. Changes in the beginning of the project may be more frequent than in later phases.

In summary, this example shows the generation of JavaScript APIs allowing interaction with EMF-like models. In particular the JavaScript APIs allow for the creation and manipulation of model instances, together with saving and loading of those model instances. This demonstrates the need for a generative approach, as manual implementation of those changes would consume large effort.

JavaScript APIs may be generated using templates. XPand, a language that is specialized on text generation based on EMF models, may be employed for generating JavaScript code.

In the particular embodiment of this example, the template code comprises three parts:
 the API template for the generation of a model API that can be used to create (XS)JavaScript model instances (ecore2js.xpt);

the Serialization API template for the generation of the serialization API that writes (XS)JavaScript model instances as XMI (ecore2jsSerializer.xpt);

the Deserializer template to generate a deserialization API that creates a (XS)JavaScript model instance from a given XMI (ecore2jsDeserializer.xpt).

Figure 3:
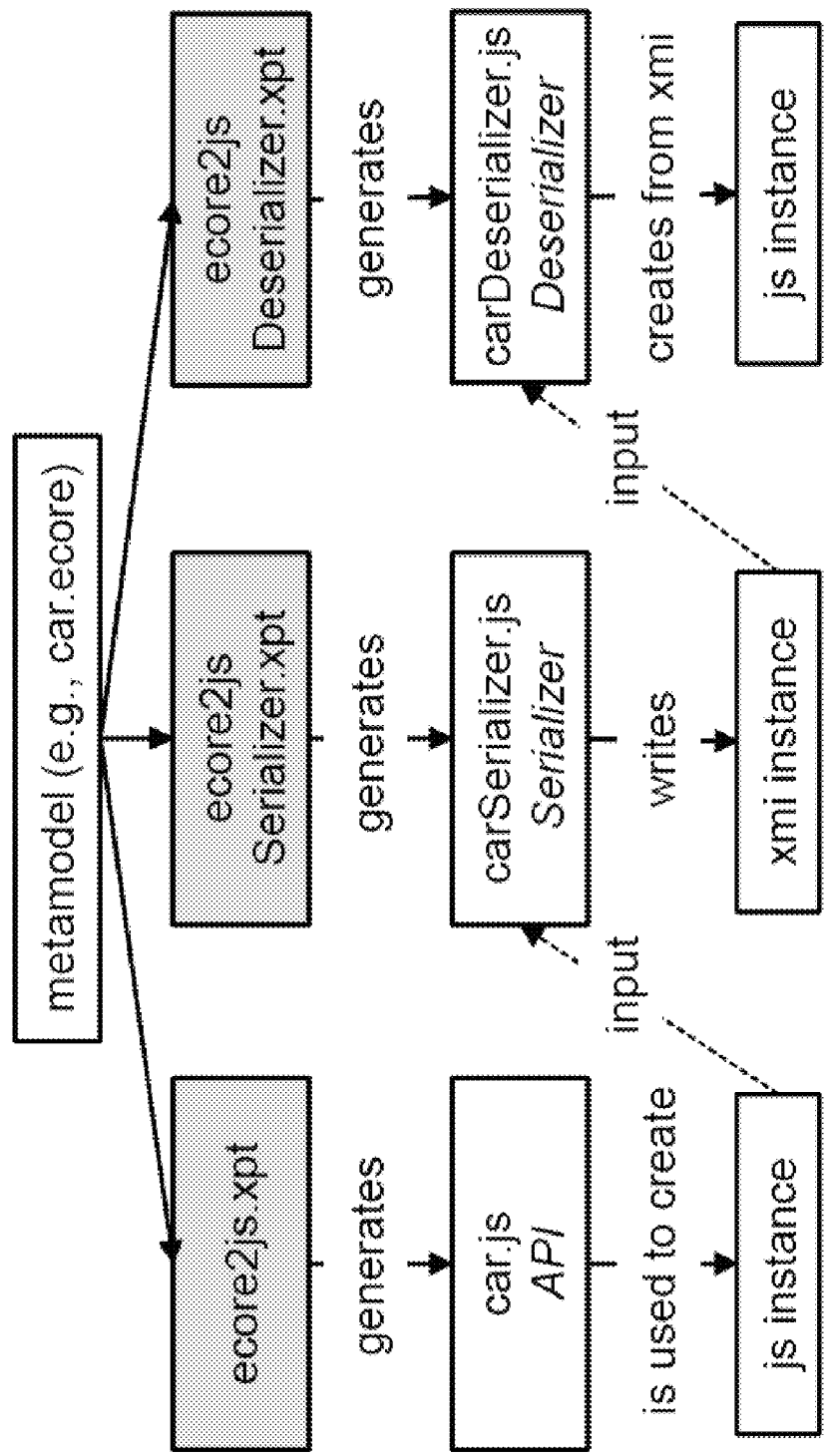
FIG. 3 is a simplified block diagram illustrating components of a code generator according to an embodiment.

FIG. 3 shows a simplified view of the generator components and the data flows for this example. In this example the templates are applied for a concrete metamodel (here car.ecore), and create JavaScript (.js) files that can then be used to create, manipulate, save and load model instances.

In order to generate files for concrete metamodels using such templates a workflow can be easily defined with the XPand workflow component.

The API template is the core of the generator templates. It creates the interfaces to create and manipulate JavaScript instances of classes modeled in Ecore.

The API template generates a factory (analog to EMF) for a specific metamodel package. Each non-abstract metamodel class (EClass) is represented by an interface within this factory and a create function that can be used to create an instance of the specific class.

In addition getters and setters are created for all references (EReference) and attributes (EAttribute) of a class.

If the attributes/references have multiplicity, lists are created to which new elements can be added. For the lists, a list implementation may be used that also handles resource and containment information.

For each data type (EDataType), interfaces and create functions are provided as well. Enum data types (EEnum) are transferred to JavaScript objects with name/literal pairs.

The following Table 1 summarizes the code fragments generated for the specific metamodel artifacts.

| metamodel artifact | generated code |
|---|---|
| EPackage | factory |
| EClass | interfaces & create function within the factory |
| EAttribute/EReference | getter and setter |
| EDataType | interface & create function within the factory |
| EEnum | object with name/literal pairs |

Validation functionality was also included within the generated API. Setter functions check the given data or respectively reference types. Additionally, a validation method is provided that checks that a model instance adheres the model specifications (e.g., cross-references, cardinalities, pattern) defined within the metamodel.

Besides the metamodel specific code, helper functions handling for example, Resource and ResourceSet objects, are generated as well. These are discussed further below.

The serialization template is now discussed. The serializer template generates code that can be used to create the XMI representation as does EMF. In addition, the serializer uses the validation functionality of the model API to validate the input model.

The template generates a public serialization-function for a specific metamodel, that can be called using a JavaScript model instance. In addition, special internal and class-specific serialization functions are generated for classes of the metamodel. These functions handle the creation of the specific XMI-part based on the class attributes and references.

The serializer template also supports annotations within the metamodel regarding the manner of serialization (i.e., how a feature should be represented in the serialization, and with which name). If no annotation is given that changes the normal serialization approach, attributes with multiplicity one, and non-containment references are serialized as XML attributes. Attributes with multiplicity many plus containment references are serialized as XML nodes. Non-containment references are handled similar to EMF using either URI fragments or IDs.

The deserialization template is now described. The deserializer template generates code that is able to load models represented in XMI-format, and transfer them to JavaScript models. The JavaScript models retrieved through the deserialization are validated to ensure model instances following the definitions of the metamodel.

The deserialization template is the counterpart of the serialization API. Similar to the serialization API, internal class-specific deserialization functions are generated for classes of the metamodel. They are handling the deserialization, while also considering metamodel annotations.

However, the deserialization workflow is more complex. During de-serialization not all non-containment references (references pointing to another part of the XMI or even outside of the given XMI) can be solved directly.

To avoid this problem and also support cross-references between different XMI resources, the generated deserialization code is split into the functionality of deserializing attributes and containment-references and deserializing non-containment references. Handling of the separated deserialize calls is done within the EResourceSet and EResource.

Usage of the APIs once generated, is now discussed. In this example the implemented generation framework was inspired by EMF, thus the generated JavaScript APIs have similar concepts as EMF.

The following explains use of the generated model, serialization, and deserialization APIs. A JavaScript model instance of a sample Ecore is created using the generated model API. In addition, serialization of such JavaScript model instances using the serializer API, and loading a serialized instance into a JavaScript model instance using the deserializer API, are now discussed.

Here, a sample model of a car is used. This model has three non-abstract classes (Car, Engine, and Dealer), one abstract class (Vehicle), and one enumeration data type (EngineType).

Specifically, a car has one engine (containment reference engine to class Engine). An engine has a type attribute, pointing to the EngineType enumeration.

Figure 4:
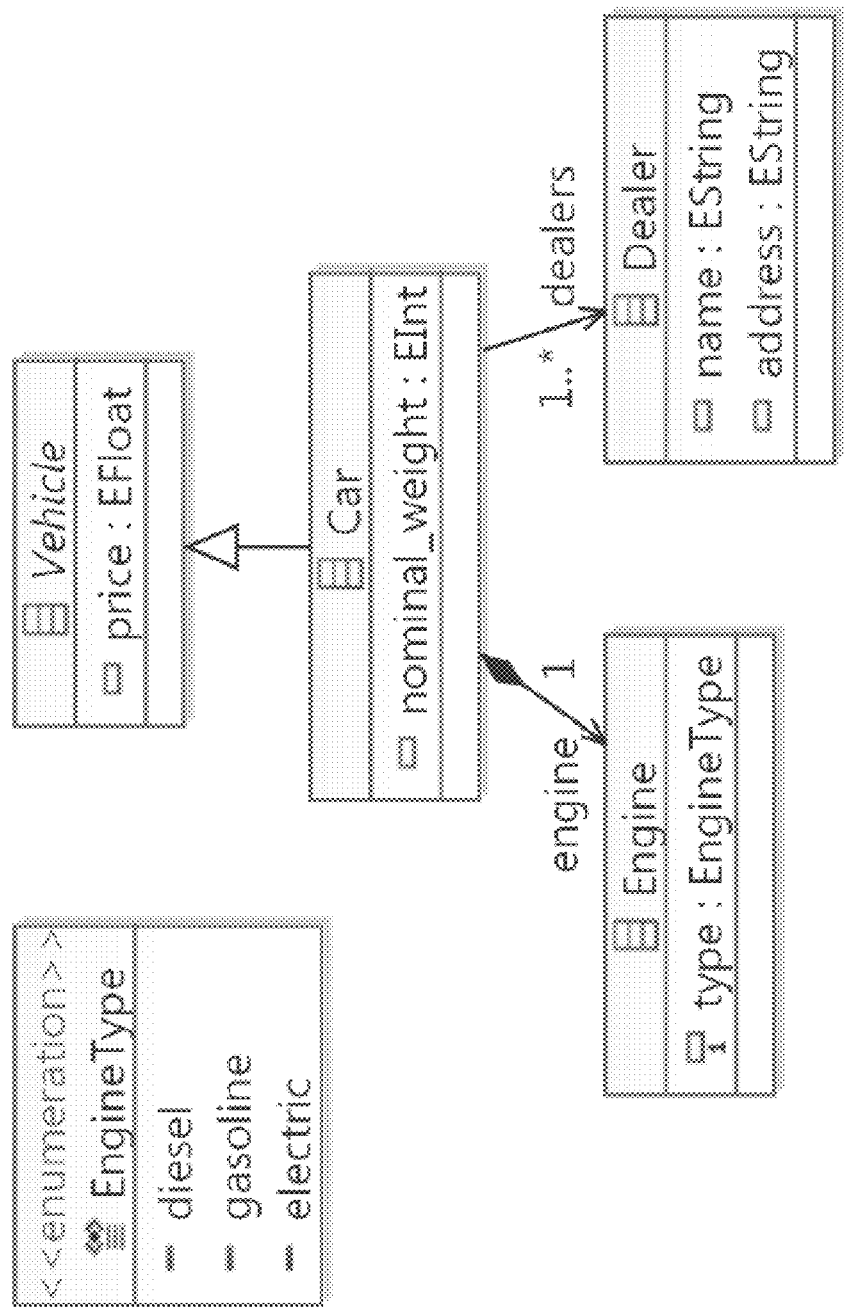
FIG. 4 is a simplified view of a sample Ecore model of a car according to the example.

A car can have one or more dealers (non-containment reference dealer to class Dealer). A dealer has a name and an address. FIG. 4 shows a sample Ecore model of a car.

Creation of a model instance using the generated API is now discussed. Similar to EMF, model elements in a model instance are created through a factory object.

The generated name of the factory uses the following convention:

<package name of Ecore model>Factory

For example, the factory of our sample car model, where the package name is called "car", would be CarFactory. So, to create class instances of classes in the car model, a factory object is created as shown in FIG. 5A.

A factory has getter and setter methods for an EResource. An EResource is an object, which is a container for one or more objects that are to be persisted together. Thus, if the model that will be created with the API is to be persisted, an EResource object is be set for the factory object.

The constructor of an URI (Universal Resource Identifier) object has one parameter—the URI of this resource. The URI is used to uniquely identify all elements contained within the resource. An example of how to set the EResource for a factory is shown in FIG. 5B.

Model elements can be created through the factory object. For non-abstract classes, the factory offers create methods, which have the following name pattern:

create<class name>

The code shown in FIG. 5C shows how an instance of class Car can be created.

Getter and setter methods are now described. Getters and setters methods are generated for structural features (attributes or references) with multiplicity one of an Ecore class.

The generated getters and setters for attributes/references follow the pattern:

get<structural feature name>
set<structural feature name>

For example, the nominal_weight and price attributes for the oCar object can be set using the code shown in FIG. 5D.

As shown in FIG. 4, the class Car does not have a price attribute on its own, but inherits it from class Vehicle. The model API can handle this inheritance, and thus inherited structural features can also be set for the child objects.

For the sake of completeness, an example for setting a reference with multiplicity one is also given. Such reference is the engine reference in class Car to class Engine as shown in FIG. 5E.

For structural features with multiplicity many, only a get method is generated. In this case, the reference points to a List implementation, thus setting a references object is done through adding the object to the list of referenced objects.

The name pattern for the methods is the same as the one above:

get<structural feature name>

To set a referenced object, one way is to get all elements of the list, and then add the referenced element to the list. The dealer reference in class Car represents such case.

First, an instance of the referenced class Dealer needs to be created and then the class instance can be added to the list of referenced objects. This is shown in FIG. 5F.

For enumerations and custom data types, the generated model API creates data type objects. They are global objects, which can be directly used. A global object for the Engine-Type enumeration is created in the model API as shown in FIG. 5G.

When setting the value for an attribute, which has an enumeration data type, the API allows either to use the properties of the defined object for the enumeration, or to directly set its string equivalent as shown in FIG. 5H.

Model validation is now discussed. The generated model API allows the validation of model elements by using the validate( ) method. The validation checks the usage of correct data types, correct types of referenced containment objects, correct multiplicity, etc.

Similar to EMF, derived features (features where the value is calculated from other related data) are not validated. An example of how to use the validation method is shown in FIG. 5I.

The serialization API is now discussed. Model instances, created with the model API, can be serialized using the generated serialization method.

The serialized representation of the JavaScript model is XMI. Similarly to EMF, an EResource object (which is attached to the factory object) is a mandatory object if a model is to be serialized.

FIG. 5J shows how to serialize a model instance, modeled with the API. It is assumed that the serialization API is loaded, and that the sample model instance created above is either in the same file or has already been loaded (e.g., the oCar object as defined above, is available).

The serialize( ) method accepts one parameter, which is the model instance to be serialized. The passed model parameter (oCar) should be the object that corresponds to the root class specified in the workflow when generating the serializer.

Thus if the serializer was generated to serialize instances of class Car (class Car is the root class), it will only accept instances of Car created with the model API factory. If another object from the model is passed (e.g., an instance of class Engine) the serialization will throw an exception.

The serialization function triggers also automatically, the model validation. If a non-valid model is passed as a parameter, the function will throw an exception with the error message from the validation. The returned result is an xml string, which represents the xmi serialization of an instance of the Ecore model.

The deserialization API is now discussed. In particular, the generated code offers also the deserialization of models, i.e., the creation of model instances as JavaScript objects based on XMI (serialized) representation of the model.

As mentioned above, the EResource object plays a central role for the serialization and thus also for the deserialization. During the deserialization, the EResource object (also just "resource") holds/contains the XMI representation of a model.

Models can also have dependencies to each other. For example there can be references from one class element (residing in Ecore model Car) to a class (residing in Ecore model Manufacturer).

For such inter-resource dependencies, the EResourceSet object (resource set) is needed. A resource set contains one or several resources, which are related to each other.

In order to deserialize a model, the XMI model instance is loaded and its string representation attached to the corresponding resource object (each xml model is handled as one resource object). Resources that are related are added to one resource set.

The deserialization is invoked at the resource set (calling deserialize( )), or alternatively when only one resource should explicitly be loaded and deserialized at the resource.

In addition to its function as container for one or several resources, the resource set can serve as a kind of registry. It holds information regarding which libraries should be used for what kind of metamodel representation. (A registry may be implemented that automatically loads the libraries and delegates this task to the user).

Therefore, before starting the deserialization corresponding mappings may be added to the resource set with the following parameters for each model URI used within one of the resources:

the factory object, which will be used to create the JavaScript model representation of the model instance; and the deserializer library for the model.

After the deserialization, the JavaScript model instance can be retrieved by calling getContent( ) on the particular resource. The obtained object can then be manipulated with the model API.

If deserialize( ) is called directly on the resource, the deserialized model instance object will be returned. If the resource has cross references to other resources, these resources are also automatically deserialized. The code example of FIG. 5K shows how a model can be loaded (deserialized).

In this example, the design decisions on the generated code's structure were influenced by a set of user requirements for the APIs. A typed API for creating, saving, and loading of model instances, may be influenced by one or more of the following factors:
1. setting of data types should be flexible;
2. the API should offer validation of the created instance;
3. metamodel changes should be handled with minimal effort;
4. saving and loading of instances should handle multiple resources;
5. support Ecore models that are generated based on XSD schemas;
6. the generation code should be tested for correctness.

In order to address one or more of these factors, some differences from EMF dictated by the specifics of JavaScript, resulted. Specifically, as opposed to Java, JavaScript is a scripting language which has dynamic typing.

Thus variables do not get assigned a specific type, but rather values denote their type. This allows for a certain freedom when setting values for attributes.

For example, for each EDataType in the Ecore model, an object will be generated for creating such data type instances in the factory of the model API. However when setting a value for an attribute, a user has the freedom to either set an instance of the defined data type from the API, or to directly set a simple type value. This applies if the data type in the Ecore model maps to a simple JavaScript type (e.g., String).

A similar situation occurs with enumerations. The user can either set one of the properties of the enumeration type as value, or can directly set a string value as literal. The latter corresponds to the value of an enumeration property.

Validation is now described as follows. The type freedom offered by the API has some influence on the validation. Because there are two alternatives on how values are set, there is also an alternative on how the validation is performed.

Validation considers each of two cases. A first case is setting a simple type value, e.g., a string or a number. A second case is setting a data type or enumeration instance.

For the validation, it may be checked whether containment references are set properly (i.e., a parent child relationship is correct.) For this reason, a list implementation was used.

A list implementation allows determination if an object instance is correct based on its "children", which are contained in a list. The list checks for correctly set resource and containment relation.

Furthermore, the type information on allowed instances may be attached to be added to this list. This allows validation of a proper setting of references.

Metamodel changes are now discussed. Within the context of this example, new API features did arise and consequently the Ecore models were changed. It was desired to handle such changes with minimum effort.

In principal, there are two types of changes. Compatible changes are changes that add new objects to the metamodel (e.g., introducing additional classes, structural features, or data types).

Incompatible changes comprise changes where elements are removed or renamed. In general, incompatible changes were not addressed, as the field of model evolution is broad and incompatible changes were sought to be avoided during the design of the model.

However, some types of compatible changes were handled in a special way due to method calls with parameters in JavaScript. In JavaScript, it is possible to define a function with parameters, but afterwards call it with less or more parameters.

If the function is called with less parameters, the missing parameters are set to null. If the function is called with more parameters, the additional parameters are ignored. Both calls (with more or less parameters) will not cause run time exceptions.

The manner in which variable parameters affect the model API when the change is an addition of a structural feature to a class, is now discussed. For instance, given the following constructor for an object, e.g., oCarFactory.createDealer (name) and seek to make an additive change (e.g., add an attribute address to Dealer), then the constructor would become oCarFactory.createDealer(address, name) (assuming that the attributes are arranged alphabetically).

Here we have one additional parameter name, this parameter is now a second parameter for this constructor. A previous valid constructor call with one parameter will be now incorrect, because this parameter will be used for address and not name. The same effect could occur for other parameter arrangements (e.g., using the ordering within the Ecore model).

It cannot be ensured that added features in the metamodel will result into constructor parameters added after the parameters from the previous version. This can lead to the issue that code for model instances created with the older version of the API (having only one parameter) will no longer be valid. Moreover, such an error will not be noticed as JavaScript will not throw a run time exception. Thus there may be the case that old code for creation of model instances can be run with the new API, but will be semantically incorrect as it will be passing the parameters wrongly.

For this reason, the parameters for constructors were omitted setting of attributes and references were allowed through getter respectively setter methods. That way, the breaking of old code due to additive changes was avoided.

Saving and loading of instances in this example is now discussed. One characteristic was the ability to save and load JavaScript API instances to and from the XMI format.

The implementation of the serializer to XMI is done by traversing the containment tree of the JavaScript object, and creating the XMI representation depending on the attributes and references set discussed above.

URI fragments were handled as follows. Specifically, as the XMI tree is being built piece-by-piece, it is not possible to set a reference to an element which has not been created yet.

An option is to traverse the tree twice. During the first traversal, elements in the XMI are created, i.e., all tags are created and their URI fragments are set. During the second traversal, missing references are set.

Such a two pass approach may not be optimal, and can lead to issues for recursive cases. To address this issue, the path of an object was built upon changes in the containment relation since the containment tree provides the actual path.

An additional property (called EUriFragment) of the JavaScript object was introduced. This URI fragment is updated on each containment change, e.g., setting a parent or adding it to a containment list. Consequently the serialization logic can be executed in one pass, setting the references by calling the getEUriFragment( ) method. This setting of the URI fragments was a second reason (apart from the validation) to use list implementation of lists, as the URI fragment can be set while adding an element to a list.

Some Ecore models however, were related to each other. Elements from one model were referencing elements from another model.

In such cases it was desirable to identify the model instances, as references through URI fragments were no longer sufficient. For this reason the EResource object was introduced, which has a URI to identify the model instance.

Each resource object was attached to a factory object to identify objects in a model instance that were created by this factory. This solves the problem of identifying references to objects in another resource during serialization.

For deserialization, the EResourceSet object was introduced. This serves both as a collection of inter referenced resources, as well as a registry map. This registry holds a mapping between a factory and the corresponding deserialization implementation.

Ecore models do not need to be modeled by hand, but may also be generated based on existing XSD schemas. In such cases, specifics of the generated Ecore models may be considered.

For example during import from XSD schema, a "DocumentRoot" class element is created in the Ecore model. This class is to be handled differently. That is, there should be no create method for it in the model API, and instances of such class should not be serialized or loaded.

Furthermore, an Ecore model generated based on an XSD schema, uses different extended metadata annotations. Those annotations control the serialization to save XMI elements in a way different to the default behavior.

For example, an annotation can change the default serialization of a class attribute to be serialized as an XMI element instead of an XML attribute. Similarly, the name annotation can change the tag or attribute name in the serialized version of the model. Consequently, support for such annotations was implemented.

A summary of various issues arising in the implementation of the code generation framework of the example, together with corresponding approaches to resolving those issues, are presented in the following Table 2.

| Problem | Solution |
| --- | --- |
| Data type freedom | Model validation should consider valid both simple types and instances of data types |
| Additive metamodel changes | No parameters allowed for the constructors, structural features are set though getter and setter methods |
| Saving and loading instances | Use the EResource and EResource set objects to identify instances and to have a registry for needed libraries |
| XSD schema support | Consider specifics of Ecore models based on XSD schema - DocumentRoot class and annotations |
| API Testing | A generic Ecore model is needed that covers available patterns that can occur in Ecore models |

The inter resource dependency handling was solved by the introduction of the resource and resource set objects. The handling of references to elements during serialization was solved by creation of URI fragments while creating object instances with the model API.

To address validation, the type freedom in JavaScript was taken into account. To deal with metamodel evolution, parameters were set through getter and setter methods (rather than through the constructor).

A generic test metamodel addressing the above issues was used in order to test the correctness of the generator implementation and of the generated code. One aspect for the implementation is that the generated APIs are correct and produce the expected results.

Here, the tests were performed using example metamodels in the range of 38-96 metamodel elements (classes and enumerations). However none of the models covered all possible cases that could be modeled.

Therefore, a generic metamodel testing the generation code was created. This generic metamodel covered as many patterns as possible, e.g., contains XSD annotations, references with different properties (e.g., containment, non-containment, different cardinalities, references between Ecore models), attributes with different properties, etc.

Within the test suite, the code for this generic test model was generated, and tested for correctness. This ensured that application of the generators on other Ecore models will result in the generated code behaving correctly.

The test model covers a set of model patterns. The following describes the modeling patterns warranting attention.

The generic model includes a number of different types of classes. Standard classes test the standard case, and to check whether the model API handles their creation correctly.

Standard classes test whether the inheritance of structural features is propagated in the create methods for those classes. Here, several inheritance patterns are modeled: instantiating an abstract class; instantiating a standard class; and instantiating a class from another package.

Furthermore, standard classes are interesting for the validation. This is because references to classes should also allow instantiations of those classes.

Abstract classes comprise another class type. Abstract classes do not get create functions in the API. They are interesting for the serialization, as only their instantiations can be serialized.

Interface classes comprise another class type. Similarly to abstract classes, the test model should include interface classes in order to test their serialization.

Document root classes comprise another class type. When an Ecore model is created based on an XSD schema, then a special document root class is created. An instance of this class is not serialized, thus it represents an interesting case to test the behavior of the generated serialization code.

Turning now to structural features, these represent both attributes and references. What they have in common is the modeling of upper and lower bounds (cardinality), extended metadata annotations, and a group of other attributes which is concerned about how structural features are stored and accessed.

Cardinality is a common modeling attribute of structural features. Thus, for each of the possible cases underneath for structural features, it may be important to model them in combination of both multiplicity one and multiplicity many cardinality in order to cover different cases that can occur in the generated code.

As for extended metadata annotations, models and their XMI representations can be tweaked using different annotations. For the (de-)serialization the annotation patterns name and kind are important. They can change the tag name in the XMI representation or change the default behavior from serializing a structural feature as attribute or as an element and vice versa.

Another annotation which is relevant for testing the validation of the model is the pattern annotation. It can be specified using a regular expression and the instance of this attribute should follow be defined according to the regular expression.

Storage and accessibility attributes are now considered. Structural features may have five boolean attributes which specify how the features store and access values: derived, transient, changable, volatile, and unsettable.

Transient attributes should not be serialized, thus this restriction should be tested. Volatile features do not get generated getter and setter methods. Changeable attributes do not have setter methods. These cases should be covered in a test model to check the correctness of the generated code.

The specific attributes for the different structural features are now described. As mentioned earlier, different combinations between the specific and common features should be modeled in order to cover a variety of cases (e.g. combinations based on possible cardinality, annotations, and specific attributes).

Regarding references, these have a number of specific attributes which can be modeled. For the generic test model a number of cases are considered.

Regarding containment versus non-containment references, containment references are serialized differently than noncontainment references, and the resource handling is different as well. Thus, both cases are to be considered when modeling the test model.

Regarding proxy, depending on whether the proxy attribute is set, the URI fragment in the serialization of references to elements has different form.

References to other Ecore models are now considered. Non-containment references, which point to classes in different resources, are serialized in a special way. They include a URI identifier of the resource in which the referenced element resided. Thus, they represent a special case for testing.

Regarding recursive references, several patterns can be modeled where recursive references occur. Such patterns include a class, having containment reference to itself and a class, which inherits from another class and has a containment reference to the super class. This pattern can occur on different levels of the containment hierarchy. These recursive references represent special cases for the serialization code and are used to test whether the generators can handle these recursive containment when producing the XMI representation of the model.

Regarding attributes, specific attributes warranting attention include ID attributes. Attributes which are marked as IDs, influence the serialization of a class. If a class has an ID attribute, then it will be referenced based on its ID and not based on a path in the XMI. The ID attributes should also be unique over the whole model, thus they also influence the validation of a model.

Another specific attribute warranting attention include default values. If a default value is set for an attribute, then it should be serialized using the default value (if not changed). Covering this feature in the test model contributes to the serialization testing.

Data type is another specific attribute warranting attention. The test model should include attributes with diverse data types. This can be important to test the validation, especially due to the flexibility of the JavaScript language mentioned previously.

Data Types and Enumerations are now discussed. EMF offers the possibility to the modeler to create custom data types and enumerations.

The test model here includes such custom data types and enumeration. Interesting features to be considered include data types, enumerations, or enumeration literals, which are key words in the generated language. For example, if an enumeration literal is called package, then the generators should handle this differently and not generate an object property package as it is a keyword in JavaScript.

Above mentioned specifics for classes, structural features, data types, and enumerations, can occur in any combination within a model. For this reason, a generic test model that represents these combinations may be used.

Tests for correctness can be performed based on the generated code for this complex model. This can help to ensure that the application of the generators on another model and the generated code will work as expected.

Modeling patterns are now discussed. In addition to the features already mentioned, several modeling patterns were included into the generic test model.

One pattern may be composite, reflecting classes that have containment references (e.g., a Car that has an Engine). Another pattern may be feature inheritance, with classes inheriting from super classes. The generic model includes abstract and non-abstract super classes. In addition, inheritance was modeled within one package and beyond packages.

Another pattern may feature recursion, where a class is directly or indirectly connected to itself via references. Different types of recursion may be included.

One type is direct recursion to the same class (e.g., a class Part that is composed of other Parts). Another type is recursion to a super class, either abstract or non-abstract (e.g., a class CompositePart inheriting from Part that contains Parts). Still another type is indirect recursion over a class in between (e.g., a class Part has Elements and those Elements can contain Parts again).

In summary, presented in this example is an approach for generating JavaScript APIs for EMF-like model manipulation. The generation of the JavaScript API is implemented using Xpand taking an Ecore metamodel as input.

The generated code comprises three parts. A first part of the generated code is for model creation and manipulation. A second part of the generated code is for saving (serialization) of a model instance to XMI. A third part of the generated code is for loading (deserialization) an XMI representation of a model instance into a JavaScript object.

Implementation and logic were explained for the Xpand templates. Use of the code in practice was provided.

For the validation of the generated code, a generic test metamodel was provided covering typical EMF-features. This can also be used in other generation projects.

The generated EMF-like JavaScript APIs were used productively in a real-world project set-up implementing a server side JavaScript application. The proposed solution is generic, thus it can be applied in diverse application areas where integration with other tooling built around EMF is needed and the development language is JavaScript.

Various other aspects are possible. For example, there may be support of sub-packages.

Another aspect may include support change notifications. Specifically, EMF provides an event framework allowing for change notification. Such a support could be useful to build tools, e.g., editors.

Still another aspect is test generation. An automatic generation of tests for the generated APIs similar to EMF would support test development.

Yet another aspect is to integrate Ecore.js. The framework of Ecore.js would allow supporting the reflective EMF API part, i.e., to implement generic application and modules on top of the JavaScript API.

The generators might be used in a context different from that specifically described above. For example, the generators might be used to create an API, with which the developers can create model instances in JavaScript. Having such an API in JavaScript allows the developers for example to create Graphical web editors for ecore models, as the developers can use JavaScript to develop the web application.

Figure 6:
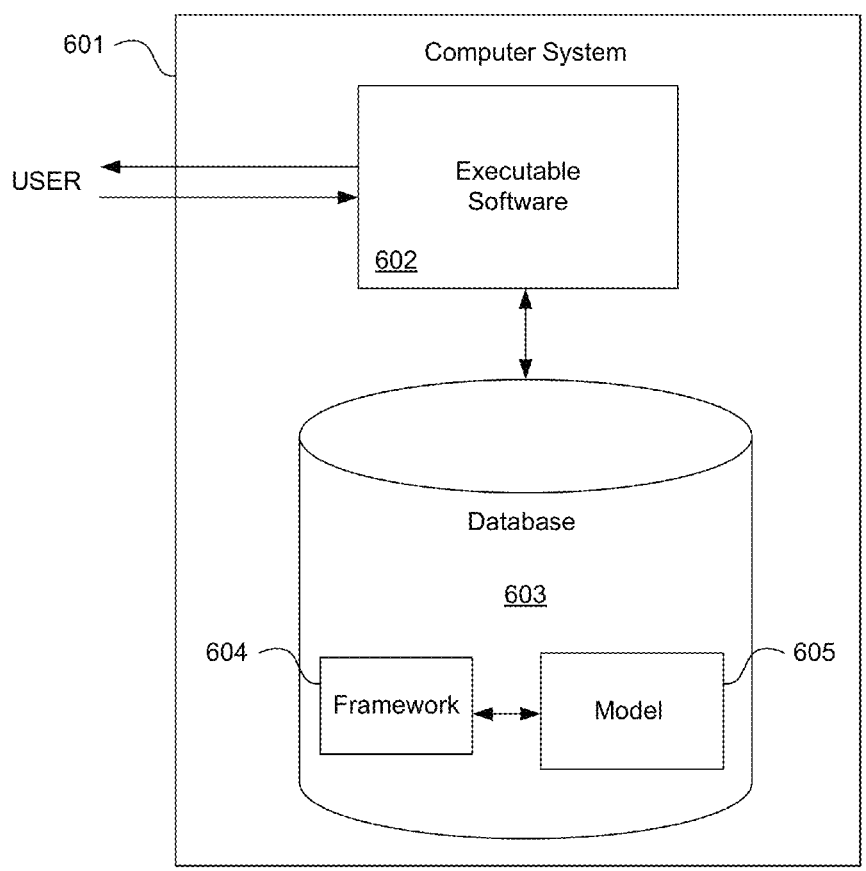
FIG. 6 illustrates hardware of one particular embodiment of a special purpose computing machine that is configured to implement a model API in a database.

FIG. 6 illustrates hardware of one embodiment of a special purpose computing machine which may be configured to implement a model API. While the embodiment illustrated in this particular figure shows the framework and the model deployed (stored) in a database, this is not required for all embodiments. Computer system 601 comprises a processor 602 that is in electronic communication with a non-transitory computer-readable storage medium 603. This computer-readable storage medium has stored thereon code 605 corresponding to a model. Code 604 corresponds to a code generation framework. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 7:
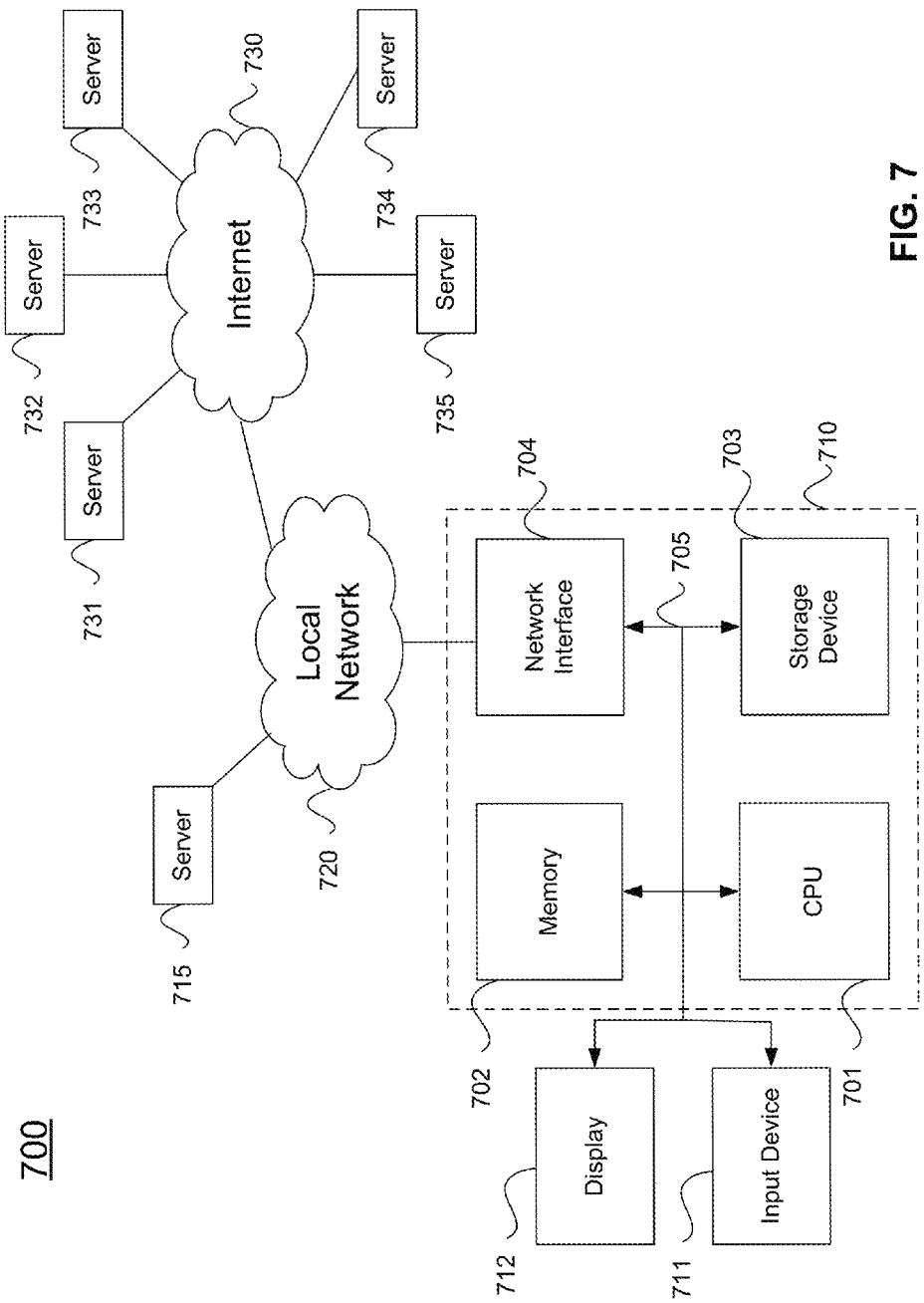
FIG. 7 illustrates an example of a computer system.

An example computer system 710 is illustrated in FIG. 7. Computer system 710 includes a bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how certain aspects may be implemented. The above examples and embodiments should not be deemed to be the only embodiments, and are presented to illustrate the flexibility and advantages of the present invention as defined by the following claims. Based on the above disclosure and the following claims, other arrangements, embodiments, and implementations may be employed.

What is claimed is:

1. A computer-implemented method comprising:
   providing a code generation framework comprising an Application Program Interface (API) code generator element, a serializer code generator element, and a deserializer code generator element; and
   in response to the code generation framework receiving a model comprising an enumeration literal as an input,
      causing the API code generator element to parse the model and generate an API used to create, manipulate, save, and load a first model instance version in a first language comprising a scripting language having dynamic typing,
      causing the serializer code generator element to parse the model and generate serialization code used to create a second model instance version in a second language from the first model instance version, wherein the model instance version in the second language is created by a follow-on application comprising a graphical model editor, and
      causing the deserializer code generator element to parse the model and generate deserialization code used to convert a model instance version in the second language into the first language, wherein the deserialization code comprises,
         a resource object having attached a string representation of the second model instance version, and
         a resource set object containing the resource object and an added resource of a referenced class element of another model,
   wherein the deserializer code generator element does not generate an object property from the enumeration literal that is a key word in the first language.

2. The method as in claim 1 wherein the model instance version in the second language comprises the second model instance version.

3. The method as in claim 1 wherein the first language comprises JavaScript or XSJS.

4. The method as in claim 1 wherein the second language comprises XMI.

5. The method as in claim 1 wherein the model is created from a JAVA interface, XML schema, or UML.

6. The method as in claim 1 wherein the model is defined in Ecore format.

7. The method as in claim 1 further comprising editing the converted model instance version in the first language.

8. A non-transitory computer readable storage medium embodying a computer program for performing a method, said method comprising:
 providing a code generation framework comprising an Application Program Interface (API) code generator element, a serializer code generator element, and a deserializer code generator element; and
 in response to the code generation framework receiving a model comprising an enumeration literal as an input,
  causing the API code generator element to parse the model and generate an API used to create, manipulate, save, and load a first model instance version in a first language comprising a scripting language having dynamic typing,
  causing the serializer code generator element to parse the model and generate serialization code used to create a second model instance version in a second language comprising XMI, from the first model instance version, wherein the second model instance version is created by a follow-on application comprising a graphical model editor, and
  causing the deserializer code generator element to parse the model and generate deserialization code used to convert a model instance version in the second language into the first language, wherein the deserialization code comprises,
   a resource object having attached a string representation of the second model instance version, and
   a resource set object containing the resource object and an added resource of a referenced class element of another model,
 wherein the deserializer code generator element does not generate an object property from the enumeration literal that is a key word in the first language.

9. The non-transitory computer readable storage medium as in claim 8 wherein the model instance version in the second language comprises the second model instance version.

10. The non-transitory computer readable storage medium as in claim 8 wherein the first language comprises JavaScript or XSJS.

11. The non-transitory computer readable storage medium as in claim 8 wherein the model is created from a JAVA interface, XML schema, or UML.

12. A computer system comprising:
 one or more processors;
 a software program, executable on said computer system, the software program configured to:
 provide a code generation framework comprising an Application Program Interface (API) code generator element, a serializer code generator element, and a deserializer code generator element; and
 in response to the code generation framework receiving a model as an input,
  cause the API code generator element to parse the model and generate an API used to create, manipulate, save, and load a first model instance version in a first language comprising JavaScript or XSJS,
  cause the serializer code generator element to parse the model and generate serialization code used to create a second model instance version in a second language comprising XMI from the first model instance version, wherein the second model instance version is created by a follow-on application comprising a graphical model editor, and
  cause the deserializer code generator element to parse the model and generate deserialization code used to convert a model instance version in the second language into the first language, wherein the deserialization code comprises,
   a resource object having attached a string representation of the second model instance version, and
   a resource set object containing the resource object and an added resource of a referenced class element of another model,
 wherein the deserializer code generator element does not generate an object property from the enumeration literal that is a key word in the first language.

13. The computer system as in claim 12 wherein the model instance version in the second language comprises the second model instance version.

14. The computer system as in claim 12 wherein the model is created from a JAVA interface, XML schema, or UML.

* * * * *